(12) United States Patent
Trifonov et al.

(10) Patent No.: US 7,587,049 B2
(45) Date of Patent: Sep. 8, 2009

(54) ACTIVE STABILIZATION OF A ONE-WAY QKD SYSTEM

(75) Inventors: Alexel Trifonov, Boston, MA (US);
Anton Zavriyev, Swampscott, MA (US);
Darius Subacius, Groton, MA (US)

(73) Assignee: MagiQ Technologies, Inc., New York, NY (US)

( * ) Notice: Subject to any disclaimer, the term of this patent is extended or adjusted under 35 U.S.C. 154(b) by 411 days.

(21) Appl. No.: 10/580,959

(22) PCT Filed: Dec. 8, 2004

(86) PCT No.: PCT/US2004/040991

§ 371 (c)(1),
(2), (4) Date: May 31, 2006

(87) PCT Pub. No.: WO2005/067189

PCT Pub. Date: Jul. 21, 2005

(65) Prior Publication Data

US 2007/0110241 A1    May 17, 2007

Related U.S. Application Data

(60) Provisional application No. 60/531,724, filed on Dec. 22, 2003.

(51) Int. Cl.
*H04L 9/00* (2006.01)
*H04K 1/00* (2006.01)
*G01B 9/02* (2006.01)

(52) U.S. Cl. ............... 380/263; 380/260; 380/278; 380/283; 380/44

(58) Field of Classification Search ........... 380/260, 380/263, 278, 283, 44, 20
See application file for complete search history.

(56) References Cited

U.S. PATENT DOCUMENTS

| | | | |
|---|---|---|---|
| 4,717,256 A | 1/1988 | Ensley | |
| 4,735,506 A | 4/1988 | Pavlath | |
| 4,783,852 A | 11/1988 | Auracher | |
| 4,840,489 A * | 6/1989 | Coccoli | 356/464 |
| 4,842,358 A | 6/1989 | Hall | |
| 5,307,410 A | 4/1994 | Bennett | |
| 5,675,648 A | 10/1997 | Townsend | |
| 6,028,935 A | 2/2000 | Rarity | |
| 6,438,234 B1 * | 8/2002 | Gisin et al. | 380/256 |
| 6,678,054 B1 * | 1/2004 | Dress et al. | 356/450 |
| 2004/0032954 A1 * | 2/2004 | Bonfrate et al. | 380/263 |

FOREIGN PATENT DOCUMENTS

GB 2368502 A 5/2002
GB 2392063 A 2/2004

* cited by examiner

*Primary Examiner*—Shin-Hon Chen
(74) *Attorney, Agent, or Firm*—Opticus IP Law PLLC

(57) ABSTRACT

A one-way stabilized QKD system (10) that utilizes a control signal (CS) and a quantum signal (QS) that travel the same path through the system from a first QKD station (Alice) to a second QKD station (Bob). The control signal is detected at Bob and used to stabilize Bob's side of the interferometer against phase variations. The system also includes a polarization control stage (200) that controls (e.g., scrambles) the polarization of the photons entering Bob. The combination of the polarization control and the active phase stabilization of the interferometer at Bob's end allows for the stable operation of the interferometer when used as part of a one-way QKD system.

20 Claims, 12 Drawing Sheets

ACTIVE STABILIZATION OF A ONE-WAY QKD SYSTEM

CLAIM OF PRIORITY

This application claims priority from U.S. Patent Application Ser. No. 60/531,724, filed on Dec. 22, 2003.

FIELD OF THE INVENTION

The present invention relates to and has industrial applicability to quantum cryptography, and in particular relates to one-way quantum key distribution (QKD) systems.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in an unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to C. H. Bennett (the '410 patent), and in the article by C. H. Bennett entitled "Quantum Cryptography Using Any Two Non-Orthogonal States", Phys. Rev. Lett. 68 3121 (1992).

The general process for performing QKD is described in the book by Bouwmeester et al., "The Physics of Quantum Information," Springer-Verlag 2001, in Section 2.3, pages 27-33. During the QKD process, Alice uses a random number generator (RNG) to generate a random bit for the basis ("basis bit") and a random bit for the key ("key bit") to create a qubit (e.g., using polarization or phase encoding) and sends this qubit to Bob.

The above mentioned publications by Bennet each describe a so-called "one-way" QKD system wherein Alice randomly encodes the polarization or phase of single photons at one end of the system, and Bob randomly measures the polarization or phase of the photons at the other end of the system. The one-way system described in the Bennett 1992 paper is based on two optical fiber Mach-Zehnder interferometers. Respective parts of the interferometric system are accessible by Alice and Bob so that each can control the phase of the interferometer. The interferometers need to be actively stabilized to within a portion of quantum signal wavelength during transmission to compensate for thermal drifts.

U.S. Pat. No. 6,438,234 to Gisin (the '234 patent) discloses a so-called "two-way" QKD system that is autocompensated for polarization and thermal variations. Thus, the two-way QKD system of the '234 patent is less susceptible to environmental effects than a one-way system.

There are two main problems with a one-way interferometer used for QKD. One of them involves time variance of the quantum signal polarization. One needs to know the polarization state of the quantum signal precisely as it arrives at Bob. Otherwise, it is very difficult to modulate the signal and keep the interferometer balanced. Another problem involves temperature drift in the interferometer, which causes a phase shift that destroys the intended interference.

Because of these problems and the lack of self-compensation in a one-way system, there is a need for systems and methods relating to stabilizing an interferometer so it can be used as part of a one-way QKD system. This need is particularly acute for manufacturing and selling a commercially viable one-way QKD system.

Figure 1:
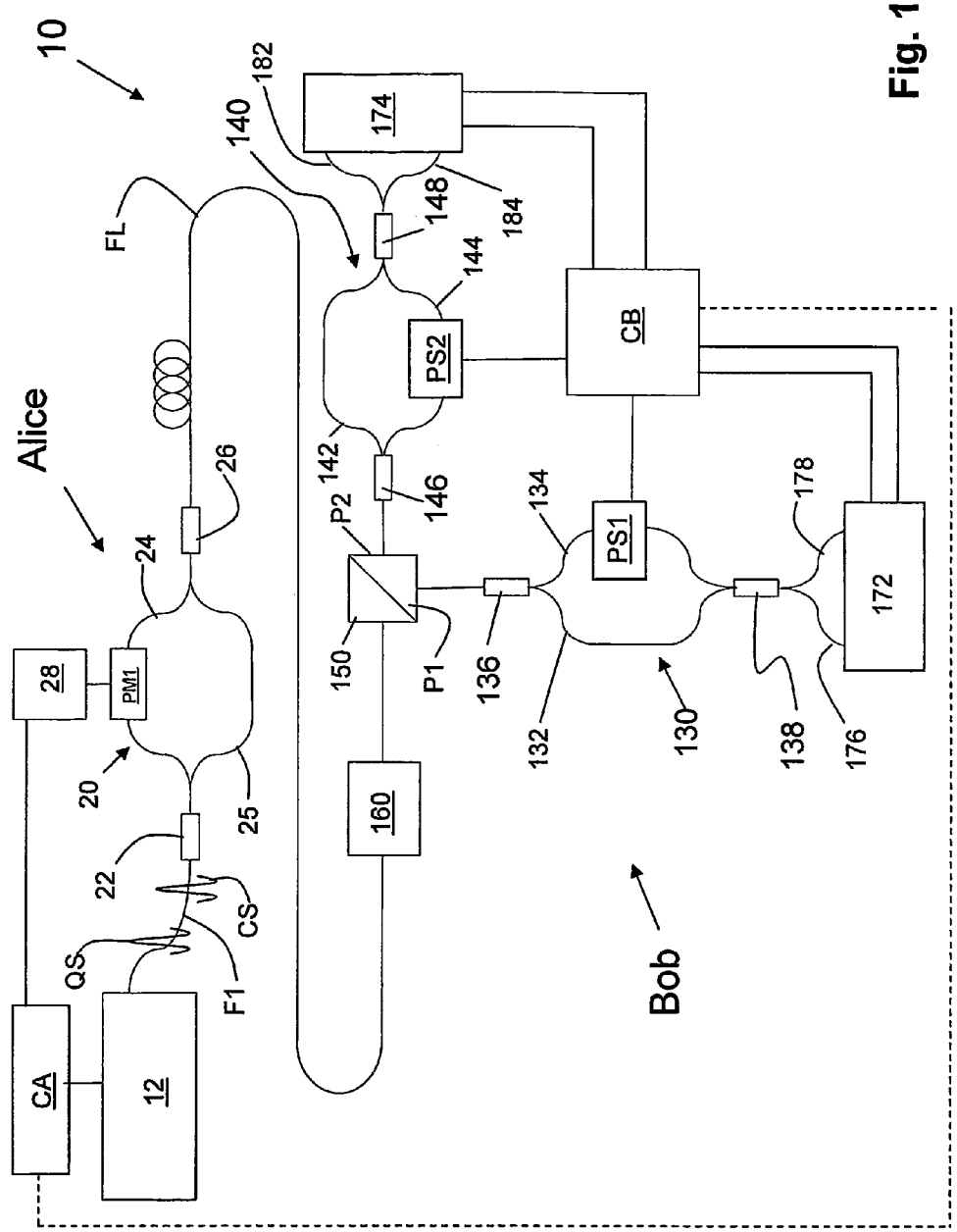
FIG. 1 is a schematic diagram of the stabilized one-way QKD system of the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to and has industrial utility in the field of quantum cryptography, and in particular relates to one-way quantum key distribution (QKD) systems. The present invention includes apparatus and methods for stabilizing an interferometer suitable for us in a one-way QKD system to stabilize its operation.

As is described in greater detail below, one aspect of the invention is a one-way stabilized QKD system that utilizes a control signal and a quantum signal that travel the same path through an interferometer. The interferometer has a first loop on one side (i.e., Alice) and at least a one loop at the other side (i.e., Bob). The interferometer includes immediately upstream from Bob a polarization control stage that acts to rapidly change the polarization state of photons entering Bob's side of the interferometer. In an example embodiment, Bob's side of the interferometer also includes a detection stage that detects both the quantum signal and the control signal. The control signal has the same three-peaked signature as the quantum signal and is used to actively stabilize the receiver-side (i.e., Bob's side) of the interferometer against polarization and phase variations. This is accomplished by the detection stage providing signals to the controller, which then adjusts (e.g., via a voltage signal) the phase shifter in one arm of the interferometer loop on Bob's side to provide the necessary compensation.

In an example embodiment, the stabilization signal (e.g., the phase-shifter voltage) is dithered to maintain a maximum set point for the quantum signal. This active stabilization process based on feedback from the control signal enables stable operation of the interferometer for the quantum signal.

Interferometer Stabilization for One-way QKD

There are two aspects of one-way QKD system stabilization: interferometer phase stabilization directed to compensating for thermally and mechanically caused drifts, and polarization control to control variations in polarization.

To attack the polarization instability problem in a one-way QKD system, one can either attempt to control the polarization at Bob's end of the system, or use a polarizer at Bob's input. Using a polarization controller is disadvantageous in terms of both cost and system losses, and placing a polarizer at Bob's input can create a situation when, due to time-dependent polarization-mode dispersion (PMD), the signal polarization will drift and some of the signal will be lost to detection.

To avoid significant loss of the quantum signal for prolonged periods of time, an example embodiment of the QKD system of the present invention, as discussed in greater detail below, includes a polarization scrambler (160) arranged in front of a polarizer (e.g., a polarization beamsplitter 150) at Bob's input. This polarization scrambler is adapted to ensure polarization randomness over the Poincare sphere, and its scrambling rate is faster than the time rate of change of the PMD of the transmission fiber, and faster than the quantum signal detection rate. The use of a polarization scrambler in combination with a polarization beamsplitter combination at the input of Bob allows for two preferred example embodiments for Bob. In the one example embodiment involving two interferometers branches ("loops") in Bob, the polarization scrambler provides polarization randomness as required by known QKD protocols, thus eliminating the need for a random number generator. The various embodiments of the QKD system of the present invention are now as described in detail below.

Alice

With reference to FIG. 1, there is shown a QKD system 10 having a first QKD station "Alice." Alice includes a quantum and control signals preparation (QCSP) stage 12 that prepares an optical quantum signal QS and an optical control signal CS for the system. The QCSP stage 12 is optically coupled via a first optical fiber segment F1 to a first fiber interferometer 20 at a first polarization-maintaining (PM) coupler 22. First fiber interferometer 20 has first and second arms 24 and 25, wherein the first arm includes a phase modulator PM1. First and second arms 24 and 25 are coupled to a second polarization maintaining coupler 26, which is also connected to a fiber link FL that is connected to a second QKD station "Bob," as described below. Alice further includes a controller CA coupled to the QCSP stage 12 for controlling the generation of the quantum signal QS and the control signal CS. Alice's controller CA includes or is coupled to a random number generator (RNG) 28, which in turn is coupled to the phase modulator PM1. The RNG 28 provides random numbers used to randomly select phase modulator states from a predetermined group of phase modulator states, in accordance with a given key exchange protocol.

QCSP STAGE EXAMPLES

Figure 2:
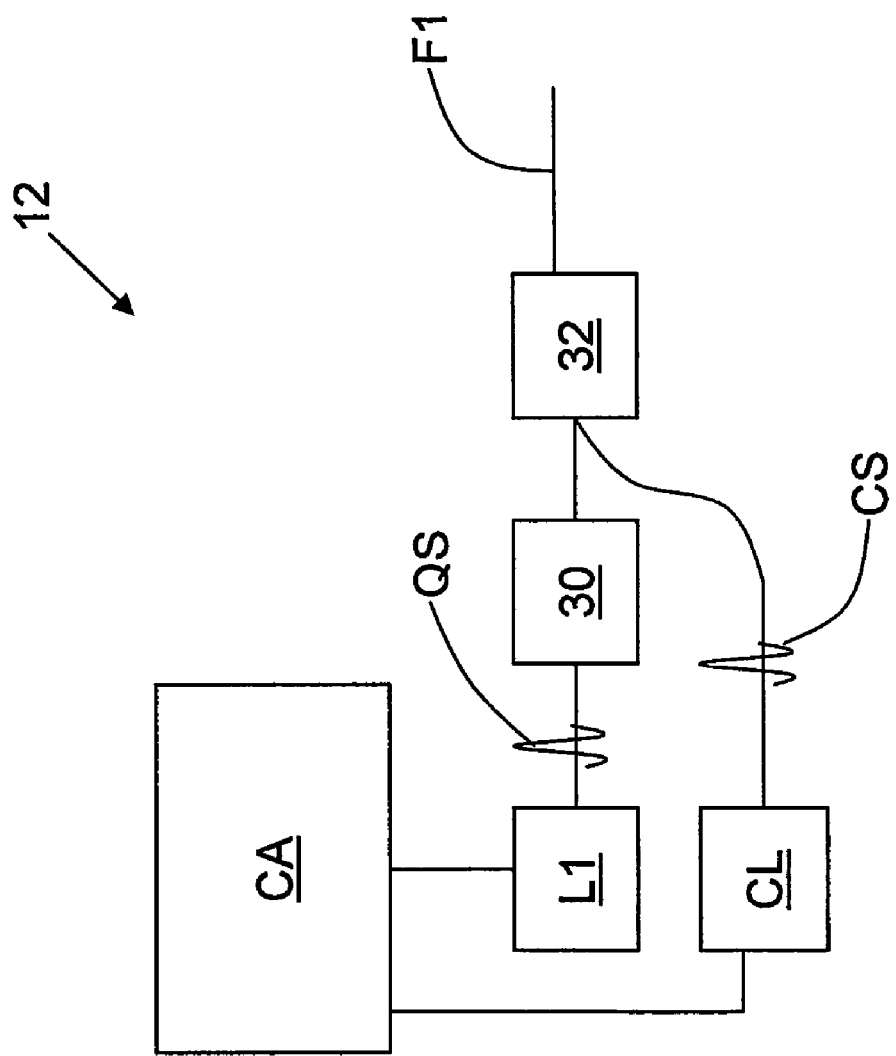
FIG. 2 is a schematic diagram of a first example embodiment of the quantum and control signals preparation (QCSP) stage of FIG. 1, which allows for the quantum signal and the control signal to have the same or different wavelengths.
Figure 3:
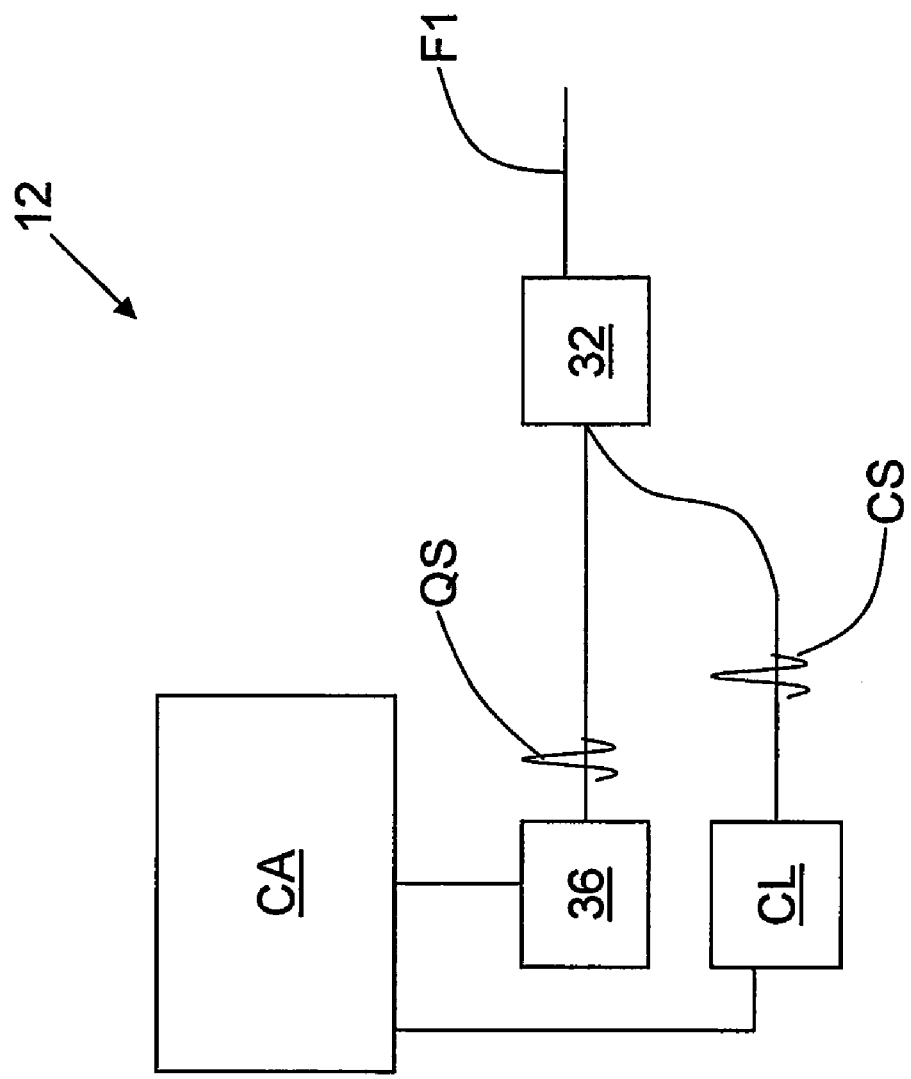
FIG. 3 is a schematic diagram of a second example embodiment of the QCSP stage similar to that of FIG. 2, but that utilizes a single-photon source.
Figure 4:
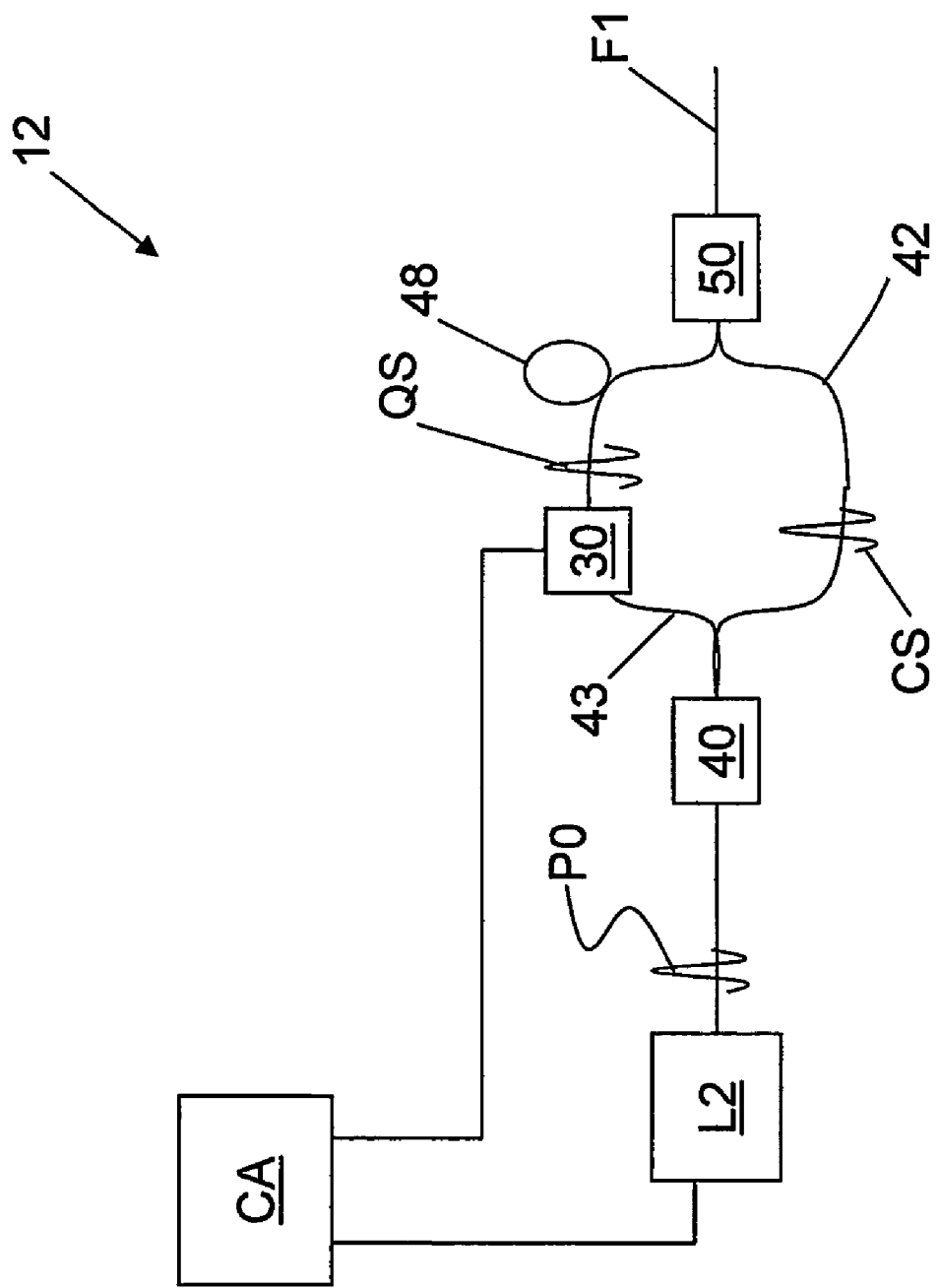
FIG. 4 is a schematic diagram of a third example embodiment of the QCSP stage for the case when only one laser is used to generate both the quantum signal and control signal.

FIGS. 2 through 4 are schematic diagrams illustrating different embodiments of the QCSP stage 12. With reference to the example shown in FIG. 2, the QCSP stage 12 includes a first laser L1 for generating the quantum signal QS. The first laser L1 is coupled to the controller CA, and is also optically coupled to a variable attenuator (VOA) 30. The QCSP stage 12 also includes a control laser CL that generates control signal CS. The control laser CL and the VOA 28 are optically coupled to a signal multiplexer 32 that combines the control signals CS from the control laser CL with the quantum signals QS from the first (quantum signal) laser L1.

In the case where the control signals CS and quantum signals QS have a different wavelength, in an example embodiment the signal multiplexer 32 is a wavelength division multiplexer (WDM) coupler. Alternatively, the VOA 30 can be placed downstream from signal multiplexer 32.

The embodiment of the QCPS stage 12 illustrated in FIG. 3 is similar to that of FIG. 2, except that the quantum signal laser L1 is replaced by a single photon source 36 that generates the quantum signals QS as single photons. Thus, the VOA 30 is not needed in the system to attenuate the quantum signal.

The embodiment of the QCSP stage illustrated in FIG. 4 is similar to that of FIG. 2, except that a single laser L2 is used to generate the control signal CS and the quantum signal QS from a single optical pulse P0. Thus, the laser is coupled to a polarization-maintaining (PM) coupler 40 two which is connected two optical fiber arms 42 and 43. The first arm 42 includes the VOA 30 and a polarization-maintaining delay section 48. The first and second arms are combined using a PM beam combiner 50.

In the above-described embodiments of the QCSP stage 12, the output of QCSP stage 12 feeds into the first interferometer loop 20 so that both the quantum signal QS and the control signal CS travel through the first interferometer loop and over the fiber link FL to Bob.

Bob

Two-loop Embodiment

With reference again to FIG. 1, a first embodiment of Bob in QKD system 10 includes first and second interferometer branches ("loops") 130 and 140 (i.e., two Mach-Zehnder interferometers). Loop 130 has arms 132 and 134 formed from two fiber sections coupled at respective ends by PM couplers 136 and 138. Likewise, loop 140 has arms 142 and 144 formed from two fiber sections coupled at respective ends by PM couplers 146 and 148.

Loop 130 has a phase shifter PS1 in arm 132, while loop 140 has a phase shifter PS2 in arm 144. The two loops 130 and 140 are coupled to respective output ports P1 and P2 of a polarization beamsplitter 150 arranged upstream of the two loops. Upstream of the polarization beamsplitter 150 is a polarization scrambler 160.

Each loop processes different polarization states for signals (photons) incoming to Bob. No matter what the photon's polarization is, it will end up in one of the two loops. This increases the key rate, but it doubles the number of system components. However, this two-loop design has certain advantages. For example, there is no need to have phase modulators at Bob. Instead, each loop 130 and 140 has respective phase shifter PS1 and PS2 in one arm, wherein the phase shifters are tuned to produce a total phase shift as required by the particular protocol used.

With continuing reference to FIG. 1, loop 130 is coupled to detection stage 172 via two optical fiber sections 176 and 178 coupled to PM coupler 138. Likewise, loop 140 is coupled to detection stage 174 via two optical fiber sections 182 and 184 coupled to PM coupler 148. Each detection stage is in turn operably coupled to a controller CB, which is also coupled to and controls the operation of the phase shifters PS1 and PS2. As described in greater detail below in connection with FIG. 10, each detection stage has a single photon detector (SPD) for detecting the quantum signal QS. By analyzing the clicks of the respective SPDs, Bob can map the data and mimic one of the standard QKD protocols (e.g., the BB84 protocol).

Figure 6:
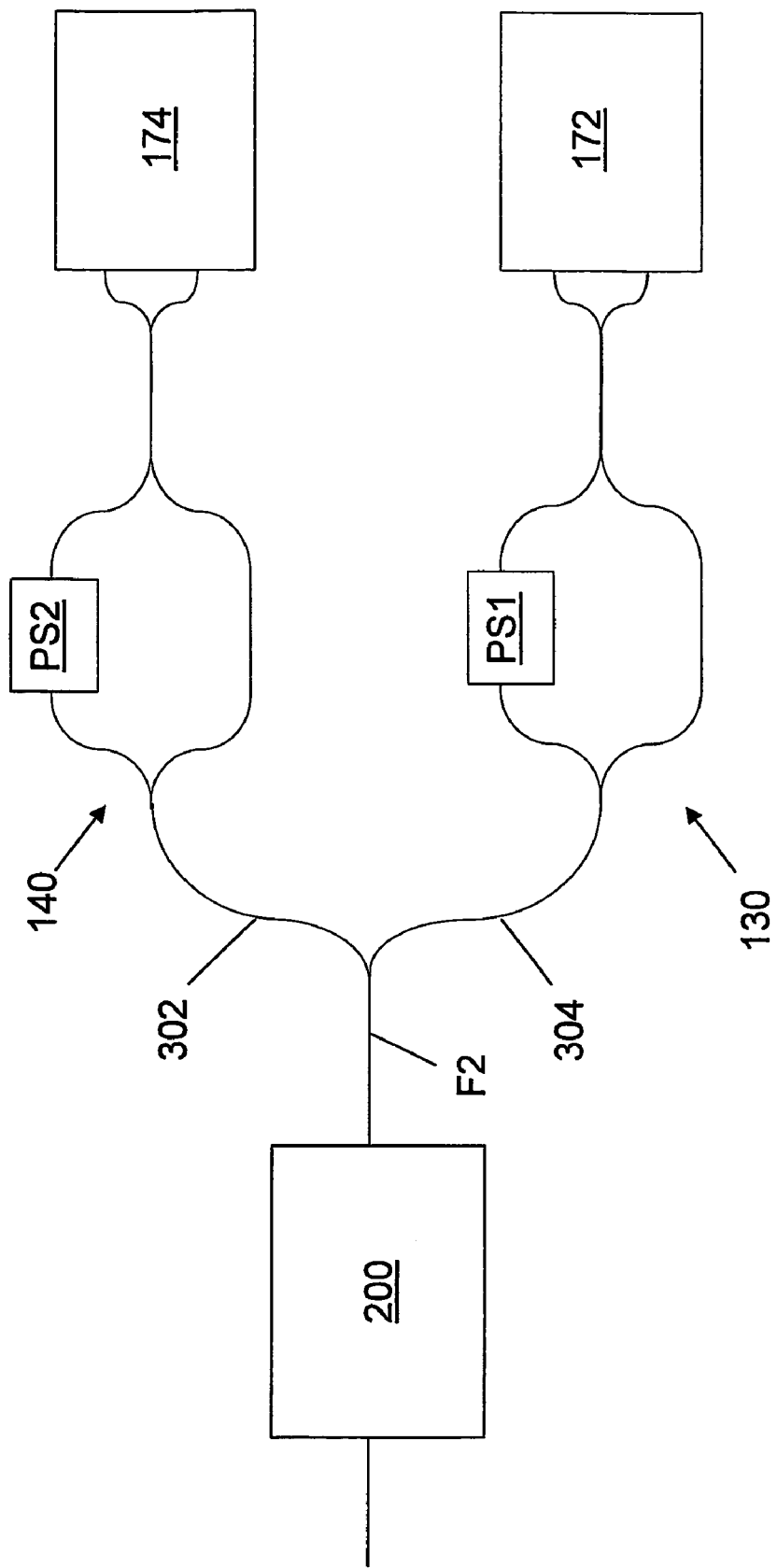
FIG. 6 is a close-up schematic diagram of alternative embodiment for a QKD system presented in FIG. 5, wherein Bob's interferometer includes two branches each having two arms, with a phase shifter coupled to an RNG in one arm, and an optional phase modulator in the other.

FIG. 6 is a close-up schematic diagram of alternative embodiment of the QKD system 10 of FIG. 1, wherein Bob's interferometer includes two branches 302 and 304 that branch off from an optical fiber section F2 coupled to polarization control stage 200. Branches 302 and 304 have respective interferometer loops 130 and 140, with one arm of each loop having respective phase shifters PS1 and PS2. Branches 302 and 304 have corresponding detection stages 172 and 174 coupled to respective loops 130 and 140. The difference between the above-described embodiment and one described in FIG. 6 is that instead of polarization splitter, a 3 dB splitter is used.

One-loop Embodiment

Figure 7:
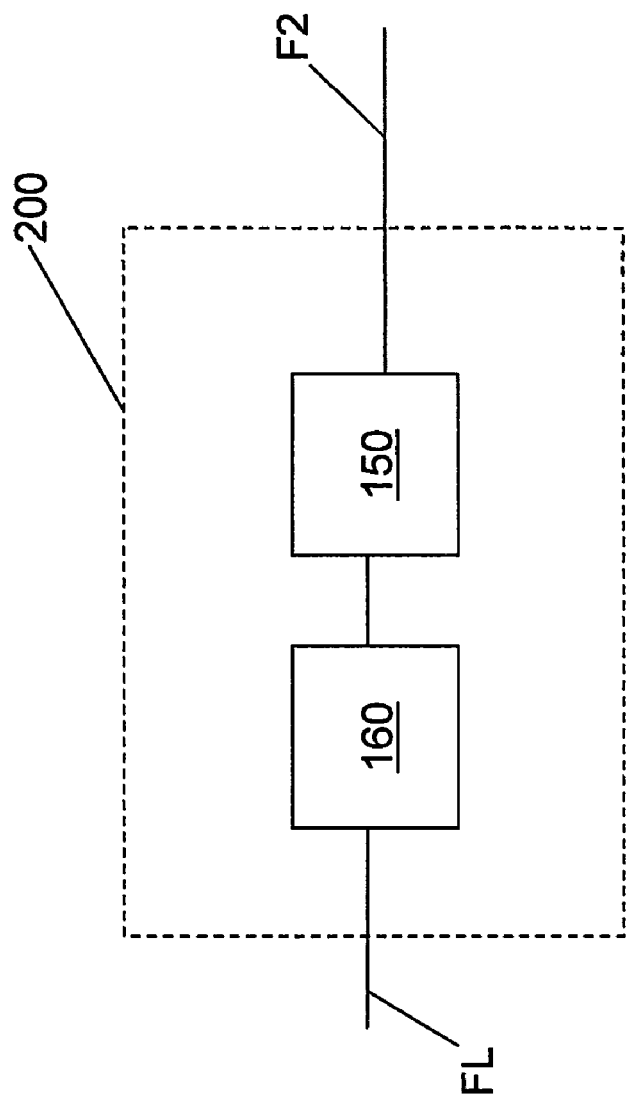
FIG. 7 is a close-up schematic diagram of an example embodiment of a polarization control stage that includes a polarization scrambler and a polarizing beamsplitter used in combination.
Figure 8:
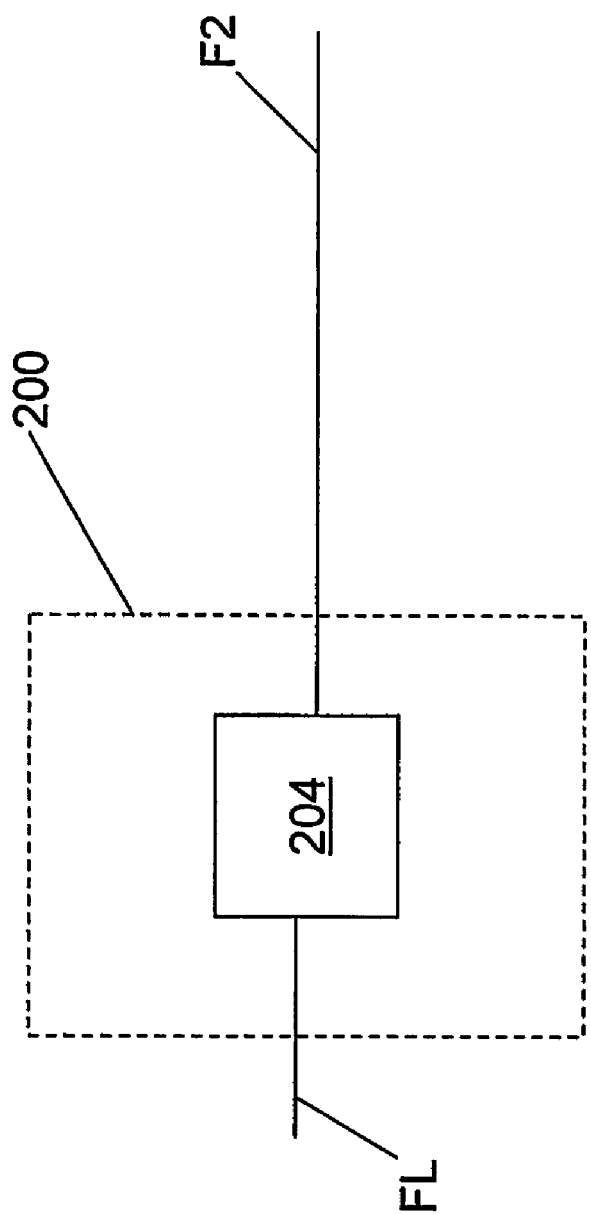
FIG. 8 is a close-up schematic diagram of an example embodiment of a polarization control stage that has just a polarization controller.

In the one-loop embodiment, the polarization problem can be solved in two ways: either using a scrambler (FIG. 7) or polarization controller (FIG. 8). With a polarization controller, any incoming polarization state is transformed into a fixed (e.g. vertical or horizontal) polarization state corresponding to a slow or fast optical axis of the PM fiber. The polarization controller uses a feedback signal from the control or quantum channel.

Figure 5:
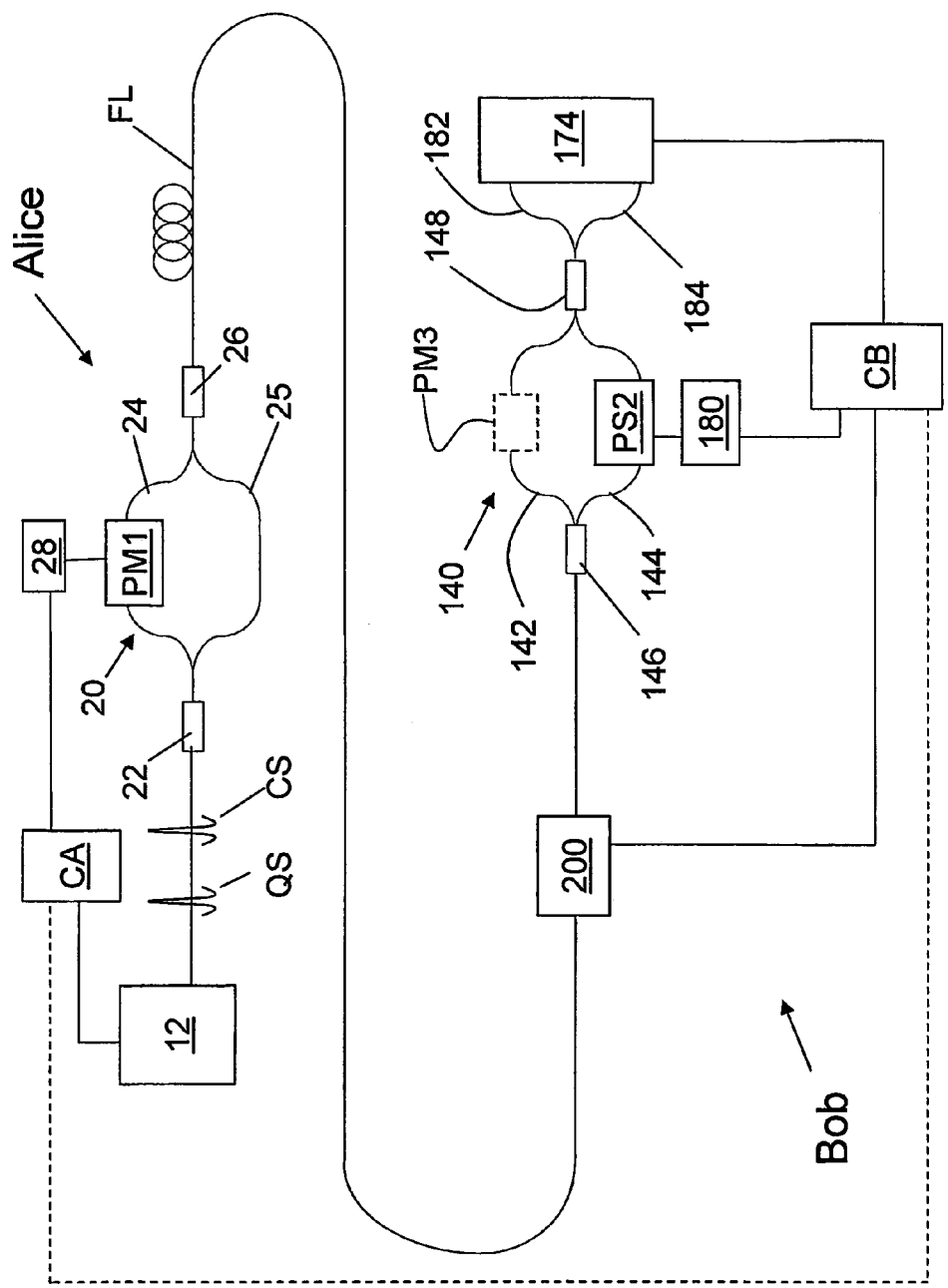
FIG. 5 is a schematic diagram similar to FIG. 1, showing an alternative embodiment of the QKD system of the present invention wherein Bob includes a single interferometer loop having a phase shifter in one arm, with the phase shifter coupled to a random number generator (RNG)

In an example embodiment of QKD system 10 as illustrated in FIG. 5, Bob has only the one interferometer (loop) 140 and the corresponding detection stage 174. In this single-loop embodiment, Bob needs to be able to randomly change the phase of the quantum signal QS. This can be accomplished with a phase modulator PM3 (dashed outline) in one arm of the loop (thus adding losses), or with a relatively loss-free phase shifter PS2. However, Bob only needs to switch the phase when a photon is detected. Due to security reasons (i.e., the low number of photons per pulse) and detector efficiency, the photon detection rate is normally not very high.

The phase shifter PS2 can be used both for stabilization and for application of a desired phase shift, as described below. Alternatively, if a phase modulator PM3 is used, then the phase shifter PS2 in the other arm is used only for tuning (stabilization) while the phase modulator is used for applying a desired phase shift in accordance with the QKD protocol used. In an example embodiment, phase shifter PS2 is coupled to an RNG 180, which in turn is coupled to controller CB.

FIG. 7 is a close-up schematic diagram of an example embodiment of the polarization control stage 200 that includes a polarization scrambler 160 and a polarizing beamsplitter 150. FIG. 8 is a close-up schematic diagram of an example embodiment of the polarization control stage 200 that includes just a polarization controller 204.

QKD System Stabilization

Figure 10:
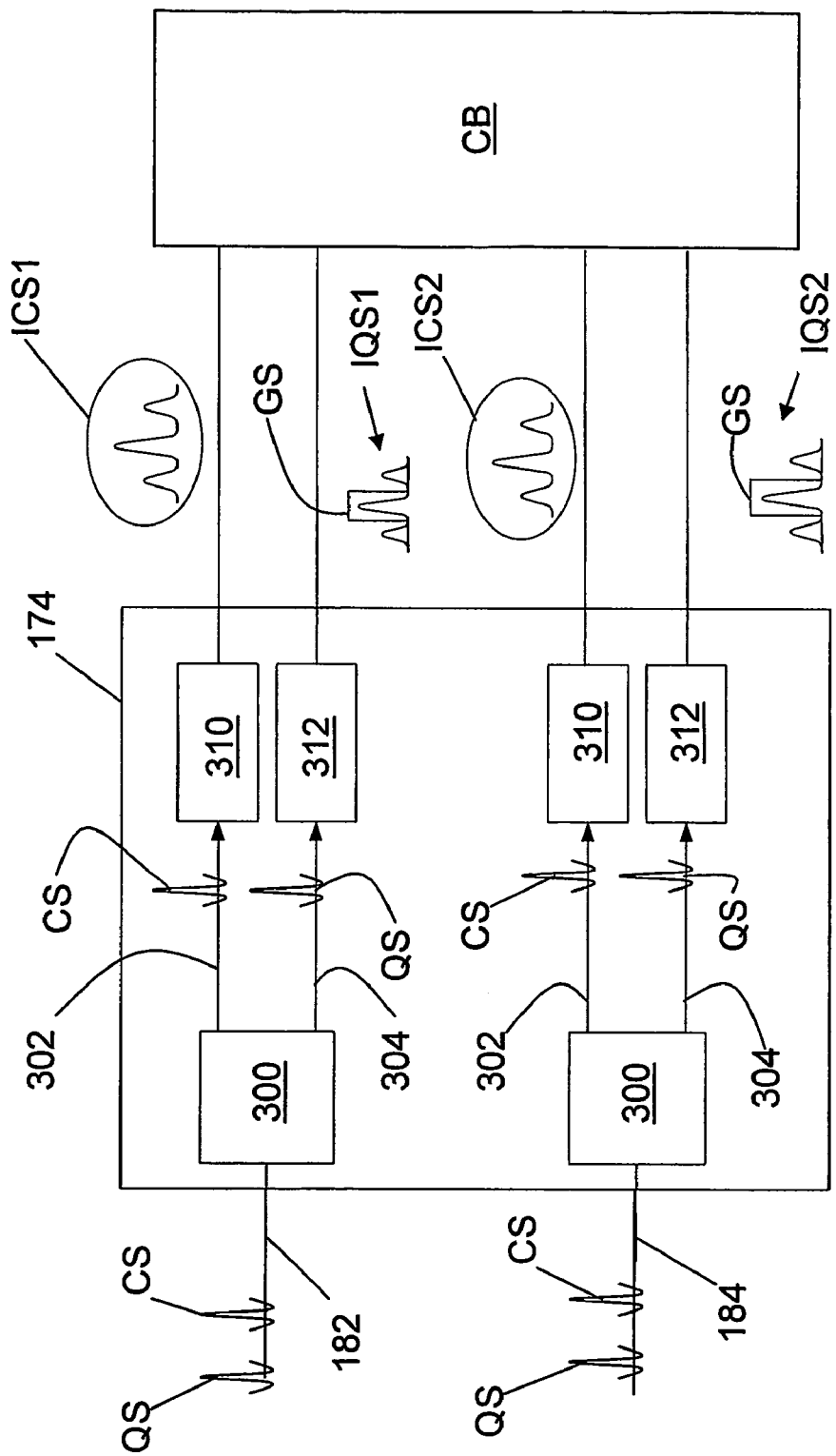
FIG. 10 is a schematic diagram of an example embodiment of the detection stage for the case where different wavelengths are used for the quantum and control signals, and showing the resulting three-peak signal pattern.

The stabilization of QKD system 10 is achieved by using feedback from control channel detection in the detection stage(s). Here, the control channel signal CS is a "classical" (i.e., a relatively strong or bright) signal having the same or different wavelength as the quantum signal QS, and follows the same path (the "interferometric path") through the interferometric part of the system. This means that the control and quantum signals CS and QS both travel at least through the interferometer loops in the first and second QKD stations Alice and Bob as well as through the fiber link FL that optically connects Alice and Bob. Note, however, that the control and quantum signals CS and QS need not travel the same optical path over the entire QKD system 10. For example, there are relatively small non-interferometric optical paths in the QKD systems where the control and quantum signals CS and QS travel different paths. With reference to FIG. 2 for example, the control and quantum signals CS and QS signals are independently generated and then combined from two different fibers onto a common optical fiber F1 using signal multiplexer 32. FIG. 10 also shows a non-interferometric path portion where the control and quantum signals CS and QS are directed to different optical fiber sections 302 and 304 and then are detected at different detectors 310 and 312. For the sake of illustration, the single-loop embodiment of QKD system 10 of FIG. 5 is referred to in the discussion below.

Figure 9:
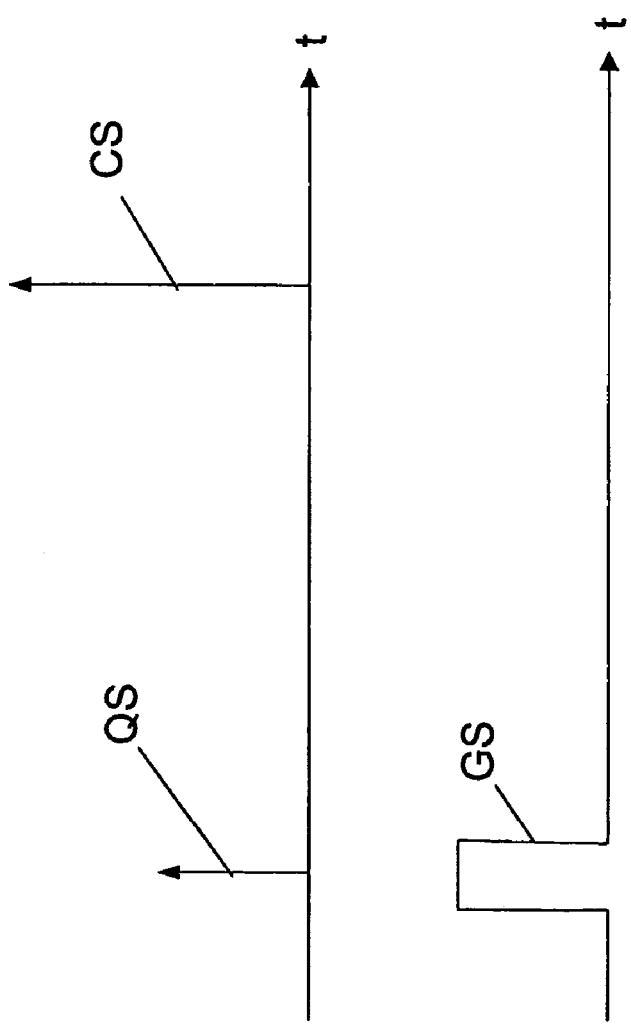
FIG. 9 is a timing diagram showing the relative timing of the quantum signal, the control signal and the gating signal, along a time axis (t)

The control signal CS (which is said to constitute the "control channel") is detected at Bob at the detection stage 174. The detection of the control signal CS does not require the use of SPD technology and gating. The control signal is time multiplexed with the quantum signal and is used for interferometer stabilization and can also be used for system timing. In this case, the control signal CS precedes the quantum signal QS (in the time domain) and triggers the timing/synchronization scheme carried out by communication between Alice's controller CA and Bob's controller CB, which are operably coupled (dashed line). For security reasons, Alice's phase modulator PM1 is not activated when a control signal CS is launched. The timing of the quantum signal QS, the control channel signal CS and the gating signal (pulse) GS for the SPD used to detect the quantum signal are shown in the timing diagram of FIG. 9.

Detection Stages

FIG. 10 is a schematic diagram of detection stage 174. Detection stage 172 of QKD system 10 of FIG. 1 is the same. The detection stage 174 includes for each input fiber 182 and 184 stemming from the PM coupler 148 respective signal demultiplexers 300. Each demultiplexer 300 has a control signal output fiber 302 and a quantum signal output fiber 304. The control signal output fiber 302 is coupled to a detector (i.e., a photodetector) 310, and the quantum signal output fiber 304 is coupled to a single photon detector (SPD) 312. The four outputs of the detection stage (namely, two SPD outputs 320 and two photodetector outputs 322) are provided to controller CB. Controller CB provides gating signals GS that select the central peak in the interfered quantum signal IQS that shows up at the respective SPDs 312.

Figure 11:
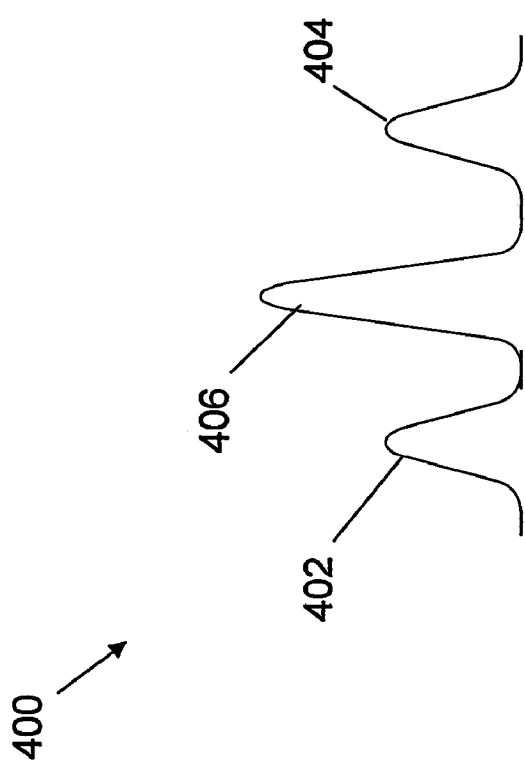
FIG. 11 is a plot of the three-peak Intensity I vs. time t signal pattern of the interfered control signal and the interfered quantum signal that is detected in each arm of the detection stage for the control and quantum signals.

The controller also receives and stores two multi-peaked interfered control signals ICS1 and ICS2 that arrive at the detectors 310. It should be noted that the electrical control signal formed from the optical signal might not have the idealized three-peak structure as shown due to the response time of detector 310. The integrated signal profile 400 of the integrated control signals ICS1 and ICS2 is essentially the same as that of the interfered quantum signals IQS1 and IQS2 and is illustrated in FIG. 11. Note that the integrated signal profile 400 has two side peaks 402 and 404 surrounding a central peak 406. The central peak 406 is caused by the multi-pass interference. Except for a phase shift and a possible different peak ratio, the integrated control signals ICS1 and ICS2 have the same form (see above) as the interfered quantum signals IQS1 and IQS1 because these signals follow the same path through the QKD system 10. Use of the control signal profiles for system stabilization is discussed further below.

If the same wavelength is used for the quantum and control signals, the signal demultiplexers 300 can be either a fast optical switch or a splitter. Detectors 310 can be standard telecom detectors for corresponding wavelengths.

Use of the polarization controller 204 upstream of Bob's beamsplitter requires that the quantum signal QS and control signal CS have the same wavelengths; they can be different if a polarization scrambler 160 is used. For the quantum signal QS, an attenuated laser source (FIG. 2) or a single-photon source (FIG. 3) can be used. Two sources (for quantum signal and for control signal) can be delayed electronically by Alice's controller CA. Also, if two signals have different wavelengths, Bob can use common WDM filters for the signal demultiplexers 300 at detection stage 174 (FIG. 10) to separate the quantum and control signals.

The same wavelength for the quantum and control signals can also be used, e.g., via the embodiment shown in FIG. 4, as discussed above. In this embodiment, a single laser pulse P0 is split in two—a weak pulse QS is used for quantum channel and a strong pulse CS used for the control channel. This method requires a delay between the quantum signal and the control signal, which calls for a time delay mechanism (for example, a fiber spool). Also, the quantum and control signals have to be separated at Bob's detection stage(s). For this purpose, fast optical switches (which are usually lossy and expensive) or splitters can be employed. If splitters are used, however, there is a danger in triggering an avalanche in a SPD used for detecting the quantum signal.

Stabilization Process

In the stabilization process, a constant total phase delay $\phi$ in the interferometer assumes a certain signal distribution in Bob's control signal detectors 310 that corresponds to the integrated control signals ICS1 and ICS2 as follows:

$$ICS1 = const_1 + const_3 \times cos(\phi) \quad ICS2 = const_2 - const_4 \times cos(\phi)$$

The constant offsets originate from the short-short and long-long pulses, since there is no gating (or high speed sampling) of the control signal detectors. To stabilize the system, the ratio of the integrated control signals ICS1 and ICS2 is kept constant. The value of the ratio does not change with signal polarization (as measured before the separating polarizer). This process is carried out for each loop in Bob via detection stage 174 in the single-loop embodiment (FIG. 5) and detection stages 172 and 172 in the two-loop embodiment (FIG. 1).

Figure 12:
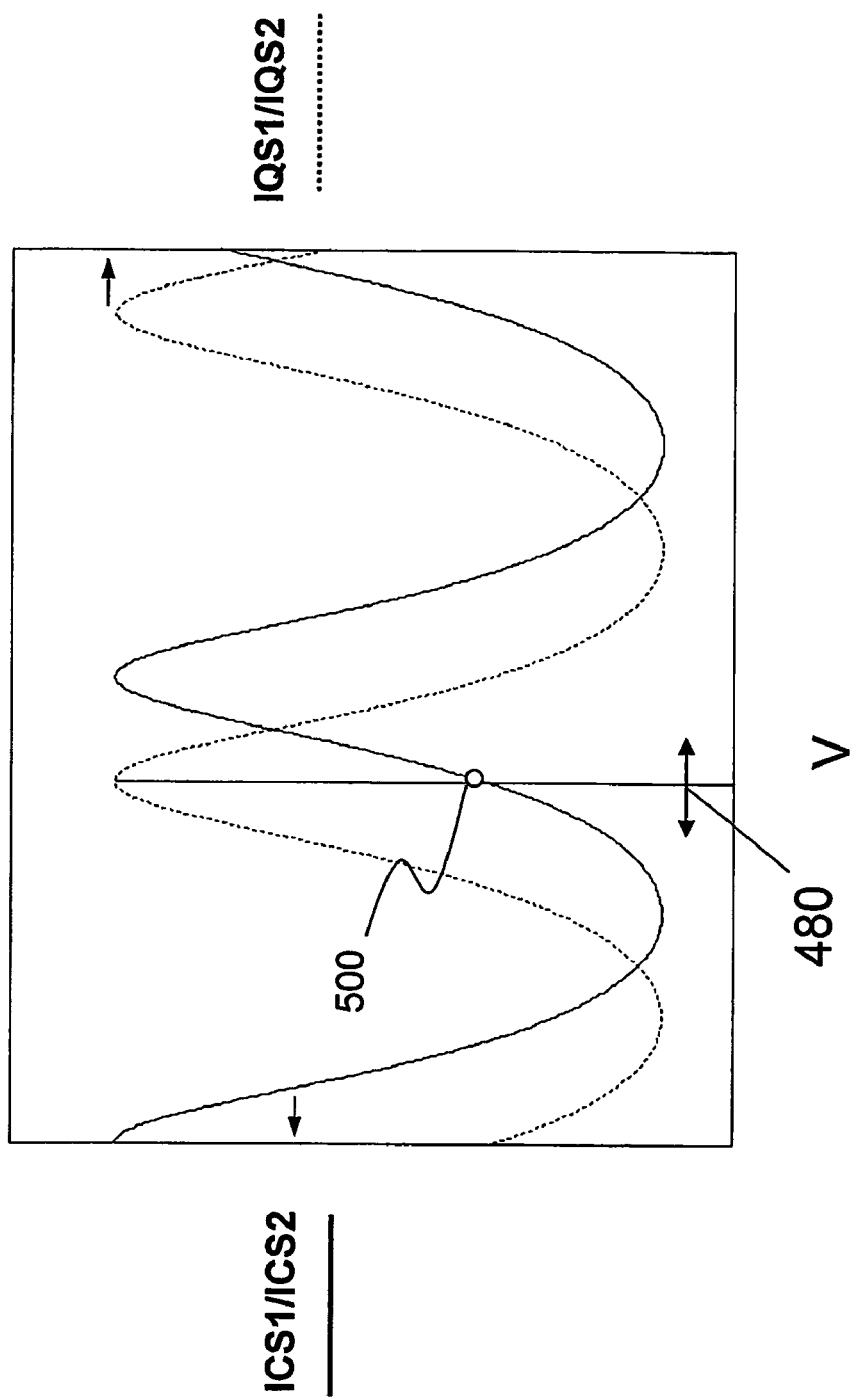
FIG. 12 is a plot of the ratio of the two interfered control signals (ICS1/ICS2) corresponding to the two detector branches that illustrate the procedure for QKD system stabilization, wherein the solid curve corresponds to interfered control signal ratio, and dashed curve corresponds to interfered quantum signal ratio (IQS1/IQS2), and wherein the vertical line indicates the relative positions of the two curves which is compensated by the controller adjusting the control voltage to the phase shifter.

In the stabilization process, the phase shifter voltage V is first scanned to induce at least a $2\pi$ phase shift (one period in FIG. 12). The signal ratios ICS1/ISC2 and IQS1/IQS2 are recorded in controller CB as a function of the phase shifter PS2 voltage. The voltage change rate should be low enough to allow for collection of statistically significant data samples for quantum signals IQS1 and IQS2. An example of a plot of these ratios is shown in FIG. 12. ICS1/ICS2 is shown as a solid line and IQS1/IQS2 as a dashed line. Next, the phase shifter voltage is adjusted to an extremum (i.e., to a maximum or a minimum) of the quantum channel ratio IQS1/IQS2. The corresponding ratio ICS1/ICS2 at the optimized phase-shifter voltage is shown as point 500 on the ICS1/ICS2 curve. The phase shifter voltage corresponding to this specific set-point ratio ICS1/ICS2 is applied to the phase shifter. In the FIG. 12, the curve for the interfered quantum signal ratio IQS1/IQS2 is shown as being identical to that for the integrated control signal ratio for the sake of illustration; in practice, the two curves are slightly different due to the gating of the quantum signals that blocks the side-peaks of the integrated signal (FIG. 11).

Because thermal or mechanical effects induce a phase difference between the two interferometer arms 142 and 144, the set-point will move on the solid curve shown in FIG. 12. To keep the signal ratio ICS1/ICS2 fixed, fast dithering as indicated by double arrow 480 is performed in a feed-back loop. That is, for a few small applied phase-shifter voltage steps, the ratio ICS1/ICS2 is measured, and this data is saved in controller CB. A voltage corresponding to a set-point value is then applied to the phase shifter. The time constant of this feedback-loop should be smaller than a time constant associated with thermal or mechanical drift of the interferometer arms.

In an example embodiment, this is achieved by identifying the point 500, which corresponds to a maximum value on a curve IQS1/IQS2, and then maintaining the phase shifter voltage V based on the value of the ratio ICS1/ICS2 at point 500 rather than trying to track the maximum of the interfered quantum signal ratio IQS1/IQS2. This is because it is much easier to measure the ratio of the interfered strong control signal pulses than that of the interfered quantum signals, since the latter measurement relies on detecting single photons.

Quantum and Control Wavelengths

In a preferred embodiment, the control channel and the quantum channel are sufficiently close in wavelength to each other to prevent phase walk-off. In the embodiment that employs the same wavelength for quantum and control signals (channels), there is no problem of interferometer temperature stabilization.

With reference again to FIG. 11, by the nature of a one-way system, the interference signal at Bob consists of three peaks 402, 404 and 406 separated in time: The first photons to arrive (peak 402) are those that choose the shortest route in both half-loops of Bob and Alice. The last photons to arrive (peak 406) are those that take the longest path in both half-loops of Bob and Alice. The photons that take the "short+long path" arrive in the middle (peak 404), and these are the important ones because they interfere, forming a large peak.

Since the SPDs 312 need to be able to discriminate between the interference signal peaks, the peak separation needs to be greater than a gate period (for example, $T_{gate}=2$ ns is a reasonable gating time for a QKD system). Thus, a safe peak separation distance is ~5 ns in time domain or, in terms of length of optical fiber, $\Delta L=L-S=1$ m, where L is the length of the longer arm of a half-interferometer and S is a length of the shorter arm.

It can be also assumed that the interferometer loops are identical (lengthwise) in Bob and Alice and that both Bob and Alice are thermally stabilized to within $\Delta T$. Further, $\lambda_Q$ and $\lambda_S$ are correspondingly quantum and control signal wavelengths.

If the temperature at Bob or Alice drifts by $\Delta T$ (° C.), the physical path difference will change by approximately $10^{-5} \times \Delta T \times \Delta L$ ($1.6 \times 10^{-5}$ is the factor of linear thermal expansion in units of degrees$^{-1}$ for a standard single-mode optical fiber). In the units of wavelength, this becomes $(10^{-5} \times \Delta T \times \Delta L)/\lambda_Q$ and $(10^{-5} \times \Delta T \times \Delta L)/\lambda_S$ for the quantum and control channels, respectively. In terms of phase, these expression become $[(2\pi)(10^{-5} \times \Delta T \times \Delta L)/\lambda_Q]$ and $[2\pi \times (10^{-5} \times \Delta T \times \Delta L)/\lambda_S]$ radians, respectively. To be precise dispersion must be taken into account, but its contribution is negligible in comparison.

Thus, the phase difference $\Delta \phi$ between the two signals changes by $\delta(\Delta \phi)=[(2\pi)(10^{-5} \times \Delta T \times \Delta L)/\lambda_Q]-[(2\pi)(10^{-5} \times \Delta T \times \Delta L)/\lambda_S]$, which is $(2\pi)(10^{-5} \times \Delta T \times \Delta L)(\Delta \lambda / \lambda_Q \lambda_S)$, where $\Delta \lambda = (\lambda_S - \lambda_Q)$. Since $\Delta \lambda << \lambda_S$ (or $\lambda_Q$), the last equation can be re-written as $\delta(\Delta \phi)=(2\pi)(10^{-5} \times \Delta T \times \Delta L)(\Delta \lambda / \lambda^2)$ where $\lambda$ substituted for either $\lambda_S$ or $\lambda_Q$.

If the interferometer visibility is assumed to be better than 26 dB (which is a reasonable practical assumption), the phase of the quantum laser needs to be controlled to within $\Delta \phi_Q \sim 3°$ (or 0.05 radians) of the designated value (0 or $\pi$). If it is assumed the control laser phase can be controlled with an absolute precision, this would imply that $\delta(\Delta \phi) < \delta \phi_Q$ or $(2\pi)(10^{-5} \times \Delta T \times \Delta L)(\Delta \lambda / \lambda^2) < \delta \phi_Q$.

Thus, the laser wavelengths should satisfy the criterion: $\Delta \lambda < (\lambda^2)(\delta \phi_Q)/(2\pi)(10^{-5} \times \Delta T \times \Delta L)$, which has an inverse relation to the precision of temperature control. This, for example, implies that the two lasers used to generate the quantum and control signals should be separated by no more than about 5 nm when the temperature is controlled at both ends of the QKD system to within 0.1° C.

What is claimed is:

1. An actively stabilized one-way QKD system, comprising:
    a first QKD station that emits a quantum signal and a control signal and that has a first interferometer loop;
    a second QKD station optically coupled to the first QKD station via an optical fiber link and that has a second interferometer loop and a detection stage operably coupled to an output of the interferometer loop, wherein the second interferometer loop has an arm with a phase shifter;
    a polarization control stage arranged immediately upstream of the second QKD station;
    a controller coupled to the detection stage and the phase shifter; and
    wherein the quantum signal and the control signal traverse the same path through the first interferometer loop, the optical fiber link, the polarization control stage and the second interferometer loop, and wherein the control signal is detected by the detection stage and is used by the controller to actively adjust the phase shifter to phase-stabilize the second interferometer loop.

2. The system of claim 1, wherein the control signal and the quantum signal have the same wavelength.

3. The system of claim 1, wherein the second interferometer loop is the only interferometer loop in the second QKD station, and wherein the second interferometer loop includes at least one adjustable phase shifter.

4. The system of claim 3, wherein the at least one phase shifter provides a stabilizing phase shift in response to a stabilization signal.

5. The system of claim 3, including dithering the stabilization signal to maintain a maximum set point for the quantum signal.

6. The system of claim 1, wherein the polarization control stage includes a polarization scrambler and a polarizing beam splitter.

7. A method of actively stabilizing a QKD system having a first interferometer loop at a first QKD station and a second interferometer loop at a second QKD station, comprising:
    sending a control signal and a quantum signal from the first QKD station to the second QKD station over an interferometric path that includes the first and second interferometer loops and an optical fiber link that optically couples the first and second QKD stations;
    detecting first and second interfered control signals ICS1 and ICS2 at the second QKD station and calculating a ratio ICS1/ISC2;
    detecting first and second interfered quantum signals IQS1 and IQS2 at the second QKD station and finding an extremum of a ratio IQS1/IQS2; and
    actively adjusting a phase in an arm of the second interferometer loop based on a value of the ratio ICS1/ICS2 corresponding to the extremum of the ratio IQS1/IQS2.

8. The method of claim 7, wherein the arm of the second interferometer includes a phase shifter driven by a voltage, and including dithering the voltage to maintain the ratio IQS1/IQS2 as constant.

9. A method according to claim 7, wherein the quantum signal and the control signal have the same wavelength.

10. The method of claim 7, wherein the second interferometer loop is the only interferometer loop in the second QKD station.

11. A method of actively stabilizing a QKD system, comprising:
    sending a control signal and a quantum signal from a first QKD station to a second QKD station over the same interferometric optical path of an interferometer;
    detecting first and second interfered control signals ICS1 and ICS2 at the second QKD station and calculating a ratio ICS1/ISC2;
    determining a value of the ratio ICS1/ICS2 that corresponds to a maximum quantum signal count; and
    actively adjusting a phase of the optical path to maintain said ratio value.

12. The method of claim 11, wherein actively adjusting the phase includes providing varying amounts of voltage to a phase shifter in a loop of the interferometer.

13. The method of claim 11, wherein the maximum quantum signal count is determined by a maximum of a ratio of interfered quantum signals detected at the second QKD station.

14. The method of claim 11, wherein the quantum signal has a first wavelength, the control signal has a second wavelength.

15. The method of claim 14, wherein the first and second wavelengths are the same.

16. A method of actively stabilizing a QKD system, comprising:
    sending a control signal and a quantum signal from a first QKD station to a second QKD station over the same interferometric optical path of an interferometer;

using the control signal to determine a maximum count of the quantum signal; and actively adjusting a phase of the optical path based on the control signal to maintain the maximum quantum signal count.

17. The method of claim 16, wherein actively adjusting the phase includes adjusting a voltage of a phase shifter in the optical path.

18. The method of claim 16, further comprising:

providing at least one phase shifter arranged in an interferometer loop in the second QKD station; and providing a stabilization signal to the at least one phase shifter to actively adjust an amount of phase shift in the optical path.

19. The method of claim 18, further comprising dithering the stabilization signal.

20. The method of claim 16, further comprising forming the control signal so that the control signal need not be detected by a single-photon detector.

* * * * *

UNITED STATES PATENT AND TRADEMARK OFFICE
CERTIFICATE OF CORRECTION

| | |
|---|---|
| PATENT NO. | : 7,587,049 B2 |
| APPLICATION NO. | : 10/580959 |
| DATED | : September 8, 2009 |
| INVENTOR(S) | : Alexei Trifonov, Anton Zavriyev and Darius Subacius |

It is certified that error appears in the above-identified patent and that said Letters Patent is hereby corrected as shown below:

In col. 8, line 62, replace 406 with -- 404 --

In col. 8, line 64, replace 404 with -- 406 --

Signed and Sealed this

Thirtieth Day of March, 2010

David J. Kappos
*Director of the United States Patent and Trademark Office*